United States Patent
Kohlstrand

(10) Patent No.: US 7,023,358 B2
(45) Date of Patent: Apr. 4, 2006

(54) METHOD AND AN ASSEMBLY FOR DETERMINING THE EXISTENCE AND THE SIZE OF A GAP

(75) Inventor: Kelly Michael Kohlstrand, Wyandotte, MI (US)

(73) Assignee: Ford Global Technologies LLC, Dearborn, MI (US)

(*) Notice: Subject to any disclaimer, the term of this patent is extended or adjusted under 35 U.S.C. 154(b) by 710 days.

(21) Appl. No.: 09/683,145

(22) Filed: Nov. 27, 2001

(65) Prior Publication Data

US 2003/0098797 A1   May 29, 2003

(51) Int. Cl.
*G08C 21/00* (2006.01)

(52) U.S. Cl. .................. 340/870.07; 33/504; 29/402.03

(58) Field of Classification Search ........... 340/870.07, 340/825.32, 825.69, 825.52; 324/207.2, 324/226; 360/825.52, 825.69; 33/783, 501.9, 33/592, 504, 543, 542; 29/402.03, 407.05, 29/194

See application file for complete search history.

(56) References Cited

U.S. PATENT DOCUMENTS

| | | | |
|---|---|---|---|
| 4,345,380 A * | 8/1982 | Vis .............................. | 33/784 |
| 4,589,199 A | 5/1986 | Ohtaki et al. | |
| 4,606,129 A | 8/1986 | Barrowman et al. | |
| 4,852,264 A | 8/1989 | Shimizu et al. | |
| 4,973,957 A | 11/1990 | Shimizu et al. | |
| 5,067,250 A | 11/1991 | Auweiler et al. | |
| 5,109,213 A | 4/1992 | Williams | |
| 5,148,158 A * | 9/1992 | Shah .......................... | 340/3.7 |
| 5,201,106 A | 4/1993 | Moore et al. | |
| 5,203,811 A | 4/1993 | Hirotani et al. | |
| 5,457,395 A * | 10/1995 | Koski et al. ................. | 324/644 |
| 5,657,550 A | 8/1997 | Struble | |
| 5,768,794 A | 6/1998 | Kelly | |
| 5,796,615 A | 8/1998 | Madaraishi et al. | |
| 6,115,930 A | 9/2000 | Shigyo | |
| 6,138,337 A | 10/2000 | Lezuch et al. | |
| 6,276,050 B1 | 8/2001 | Mauer et al. | |
| 6,308,429 B1 | 10/2001 | Green et al. | |
| 6,529,164 B1 * | 3/2003 | Carter ........................ | 342/463 |

FOREIGN PATENT DOCUMENTS

| | | |
|---|---|---|
| JP | 7-329842 | 4/1996 |
| WO | WO 02/31435 | 4/2002 |

OTHER PUBLICATIONS

2000 Series Operations Manual; Published by Advanced Telemetrics International.

* cited by examiner

*Primary Examiner*—Michael Horabik
(74) *Attorney, Agent, or Firm*—Raymond L. Coppiellie; Brooks & Kushman P.C.

(57) ABSTRACT

A method and an assembly 10 for identifying the existence and the size of a gap. Particularly, the assembly 10, in one embodiment, includes a member 50, which forcibly engages a staring gauge 16 as two members or portions abuttingly engage. The force is representative of the amount of space between the two members or portions and this information is wirelessly transmitted to a receiver and display assembly 40.

20 Claims, 3 Drawing Sheets

METHOD AND AN ASSEMBLY FOR DETERMINING THE EXISTENCE AND THE SIZE OF A GAP

BACKGROUND OF INVENTION

The present invention generally relates to a method and an assembly for determining the existence and the size of a gap and more particularly, to a method and an assembly for accurately determining the existence and the size of a vehicular air gap, such as and without limitation an air gap which may exist between a portion of the vehicular frame and a door.

It is desirable to substantially eliminate or reduce a gap that may exist between a pair of abutting members within a vehicle and within other types of assemblies in order to substantially eliminate noise and leakage. It is also desirable to consistently produce a gap of a certain size within an assembly, thereby reducing the variability of the size of produced gaps occurring within a number of created assemblies. It is also desirable to efficiently ascertain the existence of a gap in order to properly evaluate various diverse types of designs or isolate and identify portions of a design or configuration which may be modified. Further, it is desirable to accurately and reliably determine the size of an identified gap in order to accurately assess and modify a design or configuration and/or to effectively and correctly seal or eliminate a gap.

Currently utilized sensors typically include wires that physically and communicatively connect the sensor to a receiver or to a display assembly. These wires tend to dislodge the sensor from its operatively mounted position as the members or portions of the assembly become abuttingly engaged, thereby causing the sensor to provide errant measurement data. Currently utilized sensors are also relatively complex, costly, and include a large number of operatively interconnected components which increase the likelihood of failure and malfunction and which increase overall service costs. The present invention overcomes these drawbacks in a new and novel manner.

SUMMARY OF INVENTION

It is a first non-limiting advantage of the present invention to provide a method and an assembly for determining the existence and the size of a gap in a manner that overcomes some or all of the previously delineated drawbacks of prior strategies and assemblies.

It is a second non-limiting advantage of the present invention to provide a method and an assembly for determining the existence and the size of a gap in a manner which overcomes some or all of the previously delineated drawbacks of prior strategies and assemblies, and which obviates the need for wires which connect the sensor to a receiver and/or display device.

It is a third non-limiting advantage of the present invention to provide a relatively uncomplicated and cost effective assembly for identifying the existence of a gap and for measuring the size of an air gap.

According to a first non-limiting aspect of the present invention, an assembly is provided which identifies the existence of a gap and which wirelessly transmits a signal that is indicative of the existence of the gap.

According to a second non-limiting aspect of the present invention, a vehicular gap sensing assembly is provided and comprises a housing which is adapted to be placed upon a first portion of a vehicle and includes a force measurement assembly having an exposed surface and a member which is pivotally coupled to the housing and which is movable from a first position to a second position in which the member contacts the exposed surface, the force measurement assembly wirelessly transmitting a signal when the member contacts the surface; and a receiver which is in communication with the force measurement assembly and which receives a signal and creates a display based upon the received signal.

According to a third non-limiting aspect of the present invention, a method for ascertaining the existence of a gap between two portions of a vehicle is provided. Particularly, the method comprises the steps of providing a gap measurement assembly; placing the gap measurement assembly on a first of the two portions; causing a second of the two portions to come into close proximity to the first of the two portions; creating a certain signal as the second of the two portions comes into close proximity with the first of the two portions; using the certain signal to ascertain the existence of a gap and the size of a gap; providing a data acquisition assembly; creating a second signal which is indicative of the existence and the size of a gap; and wirelessly transmitting the second signal to the data acquisition assembly.

These and other features, aspects, and advantages of the present invention will become apparent to those of ordinary skill in the art from a reading of the following detailed description of the preferred embodiment of the invention and by reference to the following drawings.

DETAILED DESCRIPTION

Figure 1:
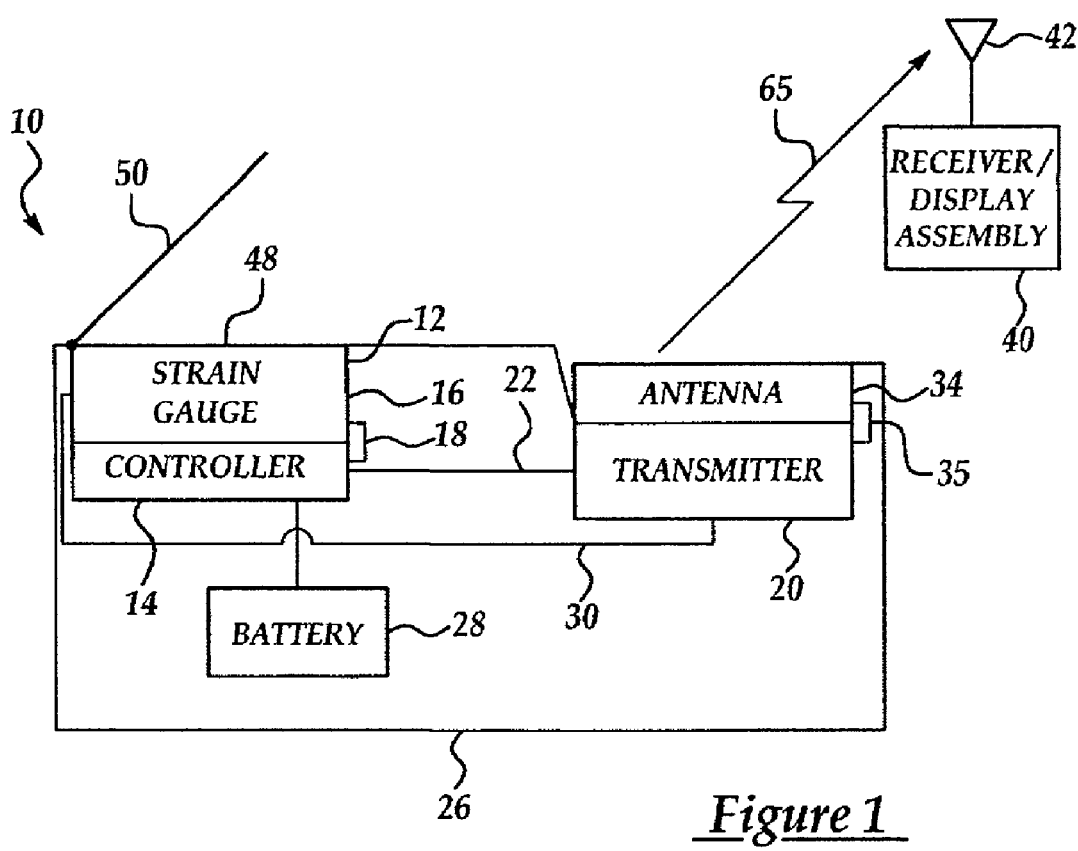
FIG. 1 is a block diagram of a gap identification and measurement assembly, which is made in accordance with the teachings of the preferred embodiment of the invention.

Referring now to FIG. 1, there is shown a gap identification and measurement assembly 10, which is made in accordance with the teachings of the preferred embodiment of the invention. Particularly, assembly 10 includes a measurement portion 12 having a controller 14 which is operable under stored program control and a strain gauge 16 which is physically and communicatively coupled to the controller 14 by the use of bus 18. In an alternate embodiment of the invention, the controller 14 and the strain gauge 12 form a single assembly.

The assembly 10 further includes a wireless transmitter 20 (e.g., a radio frequency or an infrared type of transmitter), which is physically and communicatively coupled to the controller 14 by the use of bus 22. Particularly, the measurement portion 12 and the transmitter 20 are contained within a housing 26. Assembly 10 further includes a battery or a source of energy 28, which is physically and communicatively coupled to the controller 14, to the strain gauge 16, and to the transmitter 20 by the use of bus 30, and which is also operatively contained within the housing 26. Assembly 10 further includes an antenna 34 which is coupled to the transmitter 14 by bus 35 and which may be operatively and protectively positioned within the housing 26 or which may alternatively protrude from the housing 26, and a receiver and/or display assembly 40 which includes an antenna 42.

Particularly, the receiver 40 is wirelessly and communicatively coupled to the transmitter 20 by the cooperative use of antennas 34 and 42, thereby obviating the need for wires or other members to physically couple the receiver and display portion 40 to the transmitter 20. Further, the strain gauge 16 includes a top surface 48, which is exposed or is accessible through the housing 26 and a generally flat member 50, which is pivotally coupled to the surface 48.

Figure 3:
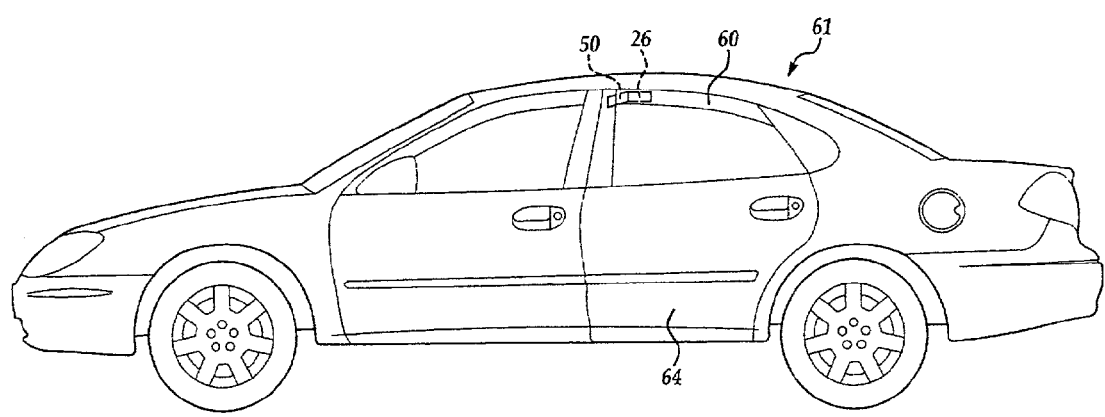
FIG. 3 is a perspective view of the gap identification and measurement assembly, which is shown in FIG. 1 operatively mounted upon a vehicle.

As shown best in FIG. 3, the housing 26 is operatively placed upon a first portion 60, such as a frame or pillar of a vehicle 61 (or other assembly) which is to abuttingly and selectively receive a door 64 (or another type of member). In one non-limiting embodiment, housing 26 may be secured to the portion 60 by an adhesive, by a fastener, by a magnet, or by any other conventional and commercial apparatuses. Particularly, the member 50 is extended from the portion 60 and is contacted by the door 64 as the door 64 closes and abuts the portion 60, thereby forcing the member 50 against the surface 48 and creating pressure or force against the surface 48. The strain gauge senses or "reads" the amount of force that is exerted upon the member 50 or upon the surface 48 and provides this information to the controller 14 by the use of bus 18. The controller 14 then associates the sensed force with a certain gap which may exist between the door 64 and the portion 60 (e.g., between the portion of the vehicular frame or pillar 60 to which the housing 26 is mounted and that portion of the vehicular door 64 which engages the protruding member 50.

That is, in the most preferred embodiment of the invention, a table is created and stored within the controller 14 and is developed through calibration. The table uniquely associates a force upon the member 50 and/or the surface 48 with a certain size of a gap that may exist between the portion of the vehicular frame or pillor 60 to which the housing 26 is mounted and the closed door 64. For example, a force of 20 Newtons typically indicates the existence of a gap having a size or a width of about one sixteenth of an inch, and a force of about 30 Newtons typically indicates the existence of a gap having a size or width of about one thirty-second of an inch. Other calibration values may be utilized in other non-limiting embodiments. As the force is sensed, the controller 14 first determines whether a gap exists by ascertaining whether the force exceeds a certain predetermined threshold value (e.g., about 40 Newtons). If the controller 14 determines that a gap exists, the controller 14 then accesses the table and an interpolation of the stored data is made to identify the size of a gap between the door 64 and the portion 60 corresponding to the currently sensed force. The existence of a gap and the size of the gap are then communicated to the transmitter 20 by the controller 14 by use of the bus 30. The transmitter 20 then wirelessly communicates this information to the receiver and display assembly 40 by the use of signal 65, effective to allow a user of the assembly 10 to identify the existence and the size of a gap between the vehicular frame portion 60 and the door 64. Hence, the use of wires or other members, which couple the receiver/display 40 to the transmitter 20, are obviated.

Figure 2:
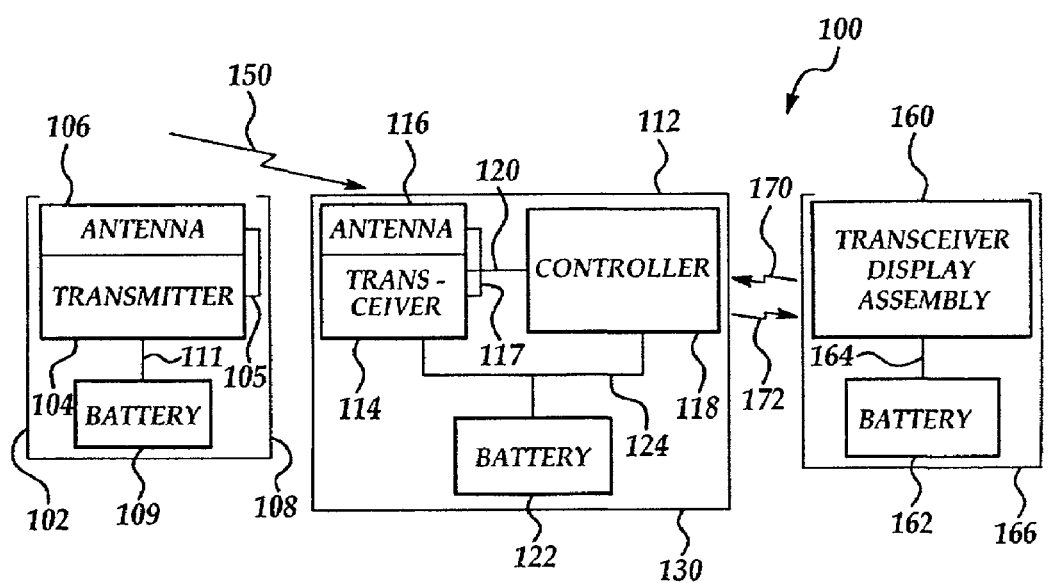
FIG. 2 is a block diagram of a gap identification and measurement assembly, which is made in accordance with the teachings of an alternate embodiment of the invention.

Referring now to FIG. 2, there is shown a gap identification and measurement assembly 100, which is made in accordance with the teachings of a second embodiment of the invention. As shown, assembly 100 includes a first portion 102, which includes a transmitter 104 and an antenna 106, which is coupled to the transmitter 104 by bus 105. The transmitter 104 and the antenna 106 are each operatively contained within a protective housing 108. Portion 102 also includes a battery or energy storage assembly 109 which is coupled to the transmitter 104 by the use of bus 111 and which is operatively contained within the housing 108.

Assembly 100 further includes a second portion 112, which includes a transmitter and receiver or "transceiver" 114 that is physically and communicatively coupled to an antenna 116 by bus 117 and a controller 118, which operates under stored program control. Particularly, the controller 118 is physically and communicatively coupled to the transceiver 114 by the use of bus 120. Further, assembly 112 includes a battery or energy storage apparatus 122, which is physically and communicatively coupled to the transceiver 114 and to the controller 118 by the use of bus 124. The transceiver 114, antenna 116, controller 118, and the battery 122 are each operatively contained within a housing 130 and, in one non-limiting embodiment of the invention, the antenna 116 is exposed or accessible through the housing 130.

In operation, the first portion 102 is placed upon a first of two members or portions, such as portion or member 60, which are to abuttingly engage. The second portion 112 is placed upon a second of the two abuttingly engaging portions, such as the vehicular door 64. As the two portions 60, 64 engage, a signal 150, which is generated by the transmitter 104 is received by the transceiver 114. The controller 118 determines the strength of the received signal (e.g., it will be at its highest level when the two members 60, 64 have abuttingly engaged). The strength of the received signal is indicative of the distance between the first and second portions 102, 112, (and between the members or portions 60, 64), thereby identifying the existence and the size of a gap between these two abuttingly engaging members. That is, a table of signal strength values is stored within the controller 118 and each signal strength value is associated with a unique gap. As before, an interpolation may be made of the stored table in order to obtain an estimate of the gap. The assembly further includes a transceiver and display assembly 160, which is coupled to a battery or energy storage device 162 by the use of bus 164. The battery 162 and the transceiver and display assembly 160 are each operatively contained within a housing 166. Particularly, the transceiver 160 generates a query type signal 170 to the receiver 114, which causes the receiver 114 to acquire the gap type information from the controller 118. The acquired information is then "read" or accessed by the transceiver 114 and set to the transceiver 160 by the use of signal 172 where it may be displayed to user. It should be appreciated that the transceiver and display assembly 160 may comprise a radio frequency or an infrared type of assembly and that transceiver assembly 114 may similarly comprise an infrared or radio frequency type of transceiver assembly and that signals 170, 172 may respectively comprise radio frequency or infrared type signals.

It is to be understood that the invention is not limited to the exact construction and method which has been delineated above, but that various changes and modifications may be made without departing from the spirit and the scope of the inventions as are more fully delineated within the following claims. Moreover, it should be appreciated that the foregoing assemblies 10 and 100 accurately identify the existence of a gap and measure the size of the gap in a relatively cost effective and uncomplicated manner and that these assemblies load 100 may be used to ensure that desired gaps of a certain size occur in number of created assemblies, thereby reducing the variability of the gap within these assemblies.

What is claimed is:

1. An assembly for identifying the existence of a gap between first and second surfaces, the assembly comprising:
a first housing disposed on the first surface and having a transmitter for wirelessly transmitting a first signal;
a second housing disposed on the second surface and spaced apart from the first housing, the second housing being adapted to receive the first signal and generate a second signal indicative of the existence of the gap based on the first signal.

2. The assembly of claim 1 wherein the second housing further comprises a transceiver for receiving the first signal and wirelessly transmitting the second signal.

3. The assembly of claim 1 comprising a signal strength measurement portion that determines a strength of the first signal.

4. The assembly of claim 3 wherein said signal strength measurement portion comprises a transmitter and a transceiver that is communicatively coupled to said transmitter.

5. The assembly of claim 1 further comprising a transceiver and display assembly adapted to receive the second signal.

6. The assembly of claim 5 wherein the transmitter, a transceiver, and transceiver and display assembly are disposed in first, second, and third housings, respectively.

7. The assembly of claim 2 wherein said transmitter and said transceiver respectively comprise a radio frequency transmitter and a radio frequency transceiver assembly.

8. The assembly of claim 2 wherein said transmitter and said transceiver respectively comprise an infrared transmitter and an infrared transceiver assembly.

9. The assembly of claim 2 further comprising a transceiver and display assembly that is communicatively coupled to said transceiver.

10. The assembly of claim 1 wherein the first housing is disposed on a first vehicle portion and the second housing is disposed on a second vehicle portion.

11. The assembly of claim 10 wherein the gap is disposed between the first and second vehicle portions.

12. A vehicular gap sensing assembly comprising a housing which is adapted to be placed upon a first portion of a vehicle and including a force measurement assembly having an exposed surface and a member which is pivotally coupled to said housing and which is movable from a first position to a second position in which said member contacts said exposed surface, said force measurement assembly wirelessly transmitting a signal when said member contacts said surface; and a receiver which is in communication with said force measurement assembly and which receives said signal and creates a display based upon said received signal.

13. The vehicle gap sensing assembly of claim 12 wherein said measurement assembly comprises a strain gauge; a controller that is coupled to said strain gauge; a transmitter that is coupled to said controller; and a battery which is coupled to said controller and to said transmitter.

14. The vehicle gap sensing assembly of claim 12 wherein said member is generally flat.

15. A method for ascertaining the existence of a gap between two portions of a vehicle, said method comprising the steps of providing a gap measurement assembly; placing the gap measurement assembly on a first of the two portions; causing a second of the two portions to come into close proximity to the first of the two portions; creating a certain signal as said second of said two portions comes into close proximity with said first of said two portions; using said certain signal to ascertain the existence of a gap and the size of a gap; providing a data acquisition assembly; creating a second signal which is indicative of the existence and the size of a gap; and wirelessly transmitting the second signal to the data acquisition assembly.

16. The method of claim 15 wherein said gap measurement assembly comprises a strain gauge assembly.

17. The method of claim 15 wherein said step of causing said second of said two portions to come into close proximity to said first of said two portions comprises the step of causing said second of said two portions to abuttingly engage said first of said two portions.

18. The method of claim 15 wherein said step of creating said certain signal comprises the step of causing said second of said two portions to create a force upon a member; and measuring said force.

19. The method of claim 15 wherein said certain signal comprises a signal strength signal.

20. The method of claim 15 wherein said first of said two portions comprises a certain portion of the frame of a vehicle and wherein said second of said two portions comprises a vehicular door.

* * * * *